United States Patent [19]

Torck et al.

[11] 3,870,653

[45] Mar. 11, 1975

[54] MODIFIED HALOGENATED ALUMINA CATALYST FOR ISOMERIZING SATURATED HYDROCARBONS

[75] Inventors: Bernard Torck, Boulogne-sur-Seine; Michel Derrien, Rueil-Malmaison; Jean-Pierre Franck, Bougival, all of France

[73] Assignee: Institut Francais du Petrole, des Carburants et Lubrifiants, Rueil-Malmaison, France

[22] Filed: Oct. 25, 1972

[21] Appl. No.: 300,587

[30] Foreign Application Priority Data
Oct. 29, 1971 France .............................. 71.39151

[52] U.S. Cl. ...... 252/429 R, 260/666 P, 260/683.7, 260/683.76
[51] Int. Cl. .............................................. C07c 5/28
[58] Field of Search ............ 252/429 R; 260/683.76, 260/683.68

[56] References Cited
UNITED STATES PATENTS

| | | | |
|---|---|---|---|
| 2,404,436 | 7/1946 | Crawford et al. ........... | 252/429 R X |
| 2,406,633 | 8/1946 | Pines et al. .................. | 252/429 R X |
| 2,939,896 | 6/1960 | Myers ....................... | 252/440 X |
| 3,242,228 | 3/1966 | Riordan et al. ................. | 252/441 X |
| 3,551,516 | 12/1970 | Ashley et al. .................... | 252/441 X |
| 3,553,281 | 1/1971 | Goble et al. .................... | 252/441 X |
| 3,726,810 | 4/1973 | Myers ............................ | 252/441 X |

*Primary Examiner*—Patrick P. Garvin
*Attorney, Agent, or Firm*—Millen, Raptes & White

[57] ABSTRACT

A catalyst comprising (a) a carrier mainly consisting of alumina, (b) an aromatic compound substituted with at least 2 hydroxy, oxo or hydrocarbyloxy groups and (c) halogen, and optionally, but preferably, containing a metal. It may be used for isomerizing saturated hydrocarbons at low temperature over long periods.

15 Claims, No Drawings

MODIFIED HALOGENATED ALUMINA CATALYST FOR ISOMERIZING SATURATED HYDROCARBONS

This invention concerns a new catalyst and its use in those reactions of hydrocarbon conversion, which require a catalyst having a very active and selective acidity. Particularly this invention concerns a catalyst comprising a composition of alumina, halogen and aromatic compound substituted with at least two hydroxy (—OH), hydrocarbyloxy and/or oxo (=O) groups. The catalyst may also comprise a metal or a metal compound of the groups VI and/or VIII of the periodic classification.

The invention also concerns the use of this catalyst for isomerizing saturated or naphthenic hydrocarbons at a relatively low temperature: the resulting isomerizates are attractive additives for manufacturing gasolines of high octane rating.

At high temperature, i.e., higher than 300°C, the isomerization of the $C_4$, $C_5$ and $C_6$ hydrocarbons may be carried out with conventional catalysts of the platinum-alumina type having a chlorine content of about 1 percent. As the thermal stability of the isoparaffins decreases as the temperature increases, the content of isoparaffins at the thermodynamic equilibrium corresponding to such temperatures is not sufficiently high for obtaining product streams of high octane rating, so that it is necessary to separate the $n$-paraffins and, if required, to recycle them. This reaction may also be carried out at a lower temperature by using catalysts containing aluminum chloride or compounds having an aluminum-chlorine bond. It is known that very active catalysts may be obtained by admixing aluminum chloride with a platinum containing alumina or by introducing chlorine into a platinum-alumina catalyst so as to have a chlorine content of from 6 to 10 percent by weight. irrespective of the particular mode of introduction of aluminum chloride, these catalysts are by themselves relatively inactive or, in any case, quickly deactivate, so that a promoter such as hydrochloric acid or a compound able to provide hydrochloric acid, for example an organic chloride, must be continuously injected into the feed charge in order to maintain a constant catalytic activity. Hydrochloric acid is thus present in the outflow and particularly in the gas recycling devices, and may result in corrosion troubles if traces of water are introduced into the plant. In any case, this continuous supply of promotor constitutes a constraint for the user.

It is shown in this invention that the catalyst obtained by the hereinafter described method has a lasting intrinsic activity and does not require the continuous supply of a promoter of catalyst activity, and particularly does not require the continuous supply of hydrochloric acid or of compounds providing the same. Thus, the suppressing of the continuous supply of a volatile inorganic acid and substituting it with the supply of an organic compound of low volatility, when manufacturing the catalyst, is quite advantageous.

This invention concerns a process for converting hydrocarbons and particularly a process for isomerizing saturated aliphatic or naphthenic hydrocarbons in the presence of a solid catalyst comprising (a) a carrier mainly containing alumina, which may optionaly contain a metal or a metal compound having hydrogenation activity, selected from the groups VI and/or VIII of the periodic classification, (b) a poly (hydroxy, hydrocarbyloxy and/or oxo) aromatic compound and (c) a halogen. The halogen may be introduced by well-known methods of alumina halogenation.

The carrier mainly consists of alumina. The aluminas which are more particularly adapted to the manufacture of these catalysts are porous aluminas of high specific surface which contain hydrogen admittedly present in the form of hydroxy groups. For example, excellent results may be obtained with aluminas manufactured by roasting $\beta$-alumina trihydrate such as bayerite or a mixture of this particular alumina with other roasted, alumina hydrates, although aluminas manufactured by roasting other alumina hydrates, such as $\alpha$-alumina trihydrate or gibbsite, $\alpha$-aluminas monohydrate or aluminae obtained by hydrolizing aluminum alcoholates may also be used. Such aluminas usually have a high specific surface of from 180 to 500 $m^2/g$ or even more. The most active catalysts are usually obtained when this surface is higher than 200 $m^2/g$ and particularly higher than 300 $m^2/g$. This point, however, is not the most important, since the content of hydroxy groups, when adding chlorine, is also responsible of the catalyst activity. Thus the thermal treatments, carried out at temperatures of from 250° to 800°C for manufacturing aluminas, must be effected in such a manner that a high specific surface and, above all, an optimum content of hydroxy groups be obtained.

It may be useful, in certain cases, to select, as the carrier, an alumina having a content of one or more refractory oxides selected from the oxides of metals from groups II and V of the periodic classification. Alumina may thus contain up to 50 percent by weight of oxides, such as silicon, titanium, beryllium, zirconium or magnesium oxides.

Alumina preferably has a relatively low content of hydrogenating metal or metal compound from groups VI or VIII of the periodic classification. The preferred metal is selected from the platinum metal group and its content may range from 0.01 to 5 percent by weight and preferably from 0.1 to 2 percent by weight. Platinum and palladium are particularly convenient metals of the platinum group. The catalyst may also contain the catalytic metals by pairs, for example platinum-iridium, platinum-ruthenium, platinum-tungsten, platinum-thallium, the additional metals, when desired, being selected from other groups than the groups VI and/or VIII. The metal must be as highly dispersed on the catalyst surface as possible, and the methods which give the required dispersion state consist either of precipitating the metal of the platinum group in the form of a sulfide, or of impregnating, for example with chloroplatinic acid, and favouring a homogenous impregnation by the addition to the medium of compounds giving rise to a co-operative chemisorption on the carrier, thus favouring a better repartition of the metal on the catalyst surface. Although not imperative, it is preferred to carry out the reduction of the metal compound with hydrogen before chlorinating the catalyst. A convenient carrier is a conventional reforming catalyst.

This alumina-containing carrier, optionaly comprising a metal of the platinum group, must contain an aromatic compound having at least 2 groups selected from the hydroxy, hydrocarbyloxy and oxo groups.

The aromatic compound is, for example, a compound which complies with the formula (R)m Ar (Z))x in which x is an integer of at least 2, preferably from 2 to 4, m is zero or an integer, (x+m) is at most the maximum valence of Ar, Ar is an aromatic radical and the m groups R, identical or different, are substituents, for example halogen atoms or monovalent hydrocarbon radicals each, containing for example, from 1 to 20 carbon atoms. The similar or dissimilar groups Z are selected from the group consisting of — OH, = O and — OR', wherein R' is a monovalent hydrocarbon radical, for example alkyl, preferably having 1–6 carbon atoms.

In these compounds, certain aromatic rings may be replaced by carbon containing conjugated rings including heteroatoms, for example N or O. A mixture of compounds of these various types may also be used.

Preferably the aromatic compound contains at least one benzene ring and is of the general formula :

$$Y_n\ C_6H_{4-n}(Z)_2$$

where the n groups Y may be, for example, alkyl, cycloalkyl or aryl groups, optionaly condensed with the benzene ring, or electronegative groups such as chlorine or other halogen. For example Y may be methyl, ethyl, n-propyl, iso-propyl, n-butyl, iso-butyl or tert. butyl ; n is an integer of 0,1,2,3 or 4.

The following compounds containing one benzene ring are examples of compounds containing at least one benzene ring substituted with at least two hydroxy or oxo groups : pyrocatechol, resorcinol, hydroquinone, benzoquinone, quinhydrone and their substitution derivatives: 3,4 - dihydroxy toluene, the chloro, fluoro and bromo resorcinols, the chloro, fluoro and bromo hydroquinones, the chloro, fluoro and bromoquinones, for example 4 - chlorocatechol, 4 -chloro resorcinol, tetrachlorohydroquinone, tetrafluorocatechol, chloranil, fluoranil, 2 - chloro - 1,4 - benzoquinone ; with respect to compounds containing several benzene rings : 1,3 -dihydroxy naphthalene, 2,3 - dihydroxy naphthalene, 1,3 - dihydroxy - 5,7 -naphthalene disulfonic acid, 1,2 - dihydroxy anthracene, 3,4 - dihydroxy phenanthrene, 2,5 - dimethyl - 1,4 - naphthoquinone, 6 -bromo - 1,4 - dihydroxy - 9,10 - anthraquinone, 1,4 -anthraquinone, acenaphthene quinone, alizarine, chloranilic acid, 1,2,7 - trihydroxy - 9,10 - anthraquinone.

This carrier of platinum and alumina must have a content of halogen, particularly chlorine, in addition to the aromatic compound. The amount of halogen added to the catalyst may range from 1 to 20 percent by weight and particularly from 4 to 12 percent, the optimal amount depending on the specific surface of the carrier. It is well-known that alumina may be chlorinated with chlorinated hydrocarbons since it is a method for manufacturing aluminum chloride from alumina. When the manufacture of an active catalyst of acceptable life time, by chlorination of a carrier of platinum and alumina, is contemplated, it is known that this chlorination must be carried out in controlled manner, particularly so as to avoid the formation of aluminum chloride since the latter sublimates at 180°C. That is why, in these conventional chlorinations, the choice of the chlorinated hydrocarbon is of major importance.

It has been observed in this invention that, when the catalyst is impregnated with a polyhydroxy - polyalkoxy or polyoxoaromatic compound, the chlorination may be carried out to a larger extent without sublimation of aluminum chloride and carrying away from the chlorination reactor during the treatment. It is thus shown in the invention that the carrier may be chlorinated to a larger extent and that the chlorination takes place much more smoothly at the catalyst surface. Thus any chlorinated hydrocarbon may be chosen for carrying out this chlorination, the choice being finally dependent on the amount of chlorine which must be introduced into the catalyst since certain hydrocarbons are more strongly chlorinating than others. The process is thus conducted in the presence of reducing compounds, i.e., the polyhydroxyaromatic compounds.

It is shown that it is preferred to effect this chlorination after impregnation of the polyhydroxy polyalkoxy or polyoxo aromatic compound, although this is not imperative : a good catalyst may also be obtained by introducing the aromatic compound after chlorination of alumina.

This chlorination may be carried out in the presence of the above reducing compounds by means of chlorinated hydrocarbons, for example carbon tetrachloride, carried along with an inert or oxidizing gas. Examples of gases to be used in this chlorination are nitrogen, oxygen and air; this chlorination may be carried out at a temperature of, for example, 120° to 600°C.

Other halogenation agents, previously proposed for manufacturing isomerization catalysts containing halogen, may be used, for example, gaseous halogens and inorganic gaseous halogen compounds, for example $SOCl_2$, $SO_2Cl_2$, $S_2Cl_2$;chloroform, methylene chloride and hexachloroethane are examples of organic compounds.

The impregnation of the catalyst with a poly (hydroxy, hydrocarbyloxy or oxo) aromatic compound may be carried out according to conventional impregnation techniques, for example by contacting the catalyst with a solution of the selected compound in a convenient solvent, for example water, a chlorinated hydrocarbon or a saturated or unsaturated hydrocarbon. After impregnation, the catalyst may contain from 0.001 to 20 percent and preferably from 0.01 to 10 percent by weight of aromatic compound.

The introduction of the aromatic compound may be effected during the chlorination by using a solution of this compound in the chlorinating agent or by stripping the said compound in the inert gas employed for the chlorination.

The catalyst may also be first chlorinated and the aromatic compound is introduced thereafter as a solution in the isomerizable hydrocarbon.

This invention thus concerns a catalyst manufactured in the above manner and also the use of this catalyst for isomerizing saturated hydrocarbons, particularly for isomerizing aliphatic or naphthenic hydrocarbons, so as to obtain products of higher octane number than the feed and which may be used in fuels, i.e., branched or unbranched aliphatic or naphthenic hydrocarbons, $C_4$ or higher, having a boiling point lower than 200°C, particularly the aliphatic or naphthenic hydrocarbons of 4 – 7 carbon atoms per molecule, for example n-butane, n-pentane, n-hexane, methylpentanes, methyl cyclopentane, cyclohexane, heptane or their mixtures. If only the n-paraffins are to be isomerized, the feed may be previously treated for separating n-paraffins from the other hydrocarbons by using separation techniques such as the molecular sieves. Topping products from the straight distillation, light naphtha fractions and hydrogenated light fractions from steam-cracking are examples of industrial containing these hydrocarbons.

In this process for isomerizing saturated hydrocarbons, the feed is contacted with the above catalyst in the presence of hydrogen and at a temperature of from 25° to 400°C, particularly from 80° to 180°C. The hydrocarbons may be maintained in the reactor either in the liquid state or in the gas state and the reaction may be carried out a pressure of from 1 atm. to 150 kg/cm², preferably from 10 to 70 kg/cm2. The reaction must be carried out in the presence of hydrogen whith a molar ratio of the hydrogen to the hydrocarbon of, for example, from 0.01 to 20 and preferably from 1.5 to 10. The space velocity concerning the introduction of hydrocarbon into the reactor is selected from 0.01 to 20 and preferably from 1.5 to 10. The space velocity concerning the introduction of hydrocarbon into the reactor is selected from 0.05 to 10 v. v. h, preferably 0.2 to 5 v. v. h.

The charge is preferably made free of sulfur, water and aromatic hydrocarbons.

The manufacture of the catalyst and its use for isomerizing paraffins at low temperature are illustrated by the following examples :

EXAMPLE 1

100 g of a conventional reforming catalyst consisting of alumina containing 0.35 percent by weight of platinum and 0.4 percent by weight of chlorine are introduced into an isomerization reactor and heated up to 200°C ; a nitrogen stream is passed therein at an hourly rate of 600 liters per liter of catalyst. Nitrogen is then saturated with carbon tetrachloride. 25 ccm of $CCl_4$ are passed in that way within 2 hours at the same nitrogen rate. The resulting catalyst contains 0.34 percent b. w. of platinum and 10.5 percent b. w. of chlorine ; n-pentane is isomerized with this catalyst under the following conditions :

Isomerisation temperature : 150°C
Reactor pressure : 20 Kg/cm2
Molar ratio H₂/hydrocarbons : 4
Space velocity : 1 v.v.h.
Water content of n-pentane : < 20 ppm The products have been analysed by vapor phase chromatography and found to have the following composition (Table I) :

TABLE I

| Product % weight | Time in hours Charge | 10 | 15 | 20 | 30 | 50 |
|---|---|---|---|---|---|---|
| Hydrocarbons < C₅ | <0.05 | 0.12 | 0.06 | 0.05 | 0.05 | 0.04 |
| Isopentane | 0.4 | 8.38 | 10.52 | 11.83 | 11.94 | 11.89 |
| n-pentane | 99.1 | 91.22 | 89.19 | 87.90 | 87.77 | 87.83 |
| Cyclopentane | 0.5 | 0.28 | 0.23 | 0.22 | 0.24 | 0.24 |

EXAMPLE 2

100 g of a conventional reforming catalyst consisting of alumina containing 0.35 percent, b.w. of platinum and 0.4 percent b.w. of chlorine are impregnated with a pyrocatechol solution in chloroform at room temperature, in order to have a pyrocatechol content of 3 percent by weight after chloroform evaporation. The catalyst is then introduced into the isomerization reactor which is heated up to 200°C in a nitrogen stream. The catalyst is then contacted with carbon tetrachloride carried along with a nitrogen stream whose hourly feed rate is 600 liters per liter of catalyst. 25 cc of carbon tetrachloride are thus introduced in 2 hours. The reactor is then heated up to 300°C and 25 cc of carbon tetrachloride are introduced again in 2 hours with the same nitrogen feed rate. The resulting catalyst then contains 0.35 percent b.w. of platinum and 11 percent b.w. of chlorine. n-pentane is isomerized with the so-treated catalyst. The test conditions are the following :

Isomerization temperature : 150°C
Reactor pressure : 20 Kg/cm2
Molar ratio H₂/hydrocarbon : 4
Space velocity : 1 v.v.h.

Water content of n-pentane > 20 ppm The products have been analysed by vapor phase chromatography and found to have the following composition (Table II)

TABLE II

| Product % weight | Time in hours Charge | 10 | 20 | 50 | 100 | 300 |
|---|---|---|---|---|---|---|
| Hydrocarbons < C₅ | <0.05 | 0.1 | 0.15 | 0.12 | 0.10 | 0.10 |
| Isopentane | 0.4 | 36.0 | 44.0 | 60.0 | 58.0 | 59.0 |
| n-pentane | 99.1 | 63.57 | 55.55 | 39.59 | 41.61 | 40.6 |
| Cyclopentane | 0.5 | 0.33 | 0.30 | 0.29 | 0.20 | 0.30 |

EXAMPLE 3

The same catalyst as in example 2 has been impregnated with pyrocatechol, in order to have a 0.5 percent b.w. content of pyrocatechol after chloroform evaporation. The same treatment as in example 2 is applied thereto and n-pentane is isomerized under the same conditions as before. The products have been analysed by chromatography and found to have the composition of Table III.

TABLE III

| Product % weight | Time in hours Charge | 10 | 20 | 30 | 50 | 80 |
|---|---|---|---|---|---|---|
| Hydrocarbons < C₅ | <0.05 | 0.15 | 0.17 | 0.15 | 0.12 | 0.10 |
| Isopentane | 0.4 | 45.0 | 55.0 | 61.2 | 68.3 | 72.5 |
| n-pentane | 99.1 | 54.55 | 44.5 | 38.3 | 31.3 | 27.1 |
| Cyclopentane | 0.5 | 0.3 | 0.33 | 0.35 | 0.28 | 0.30 |

EXAMPLE 4

100g of a conventional reforming catalyst consisting alumina containing 0.35 percent b.w. of platinum and 0.35 percent b.w. of chlorine are impregnated with a solution of tetrachlorohydroquinone in chloroform at room temperature so as to have a tetrachlorohydroquinone content of 1.5 percent b.w. after chloroform evaporation. The catalyst is maintained at 150°C for 2 hours in a nitrogen stream. The catalyst is then charged into the isomerization reactor which is heated up to 200°C in a nitrogen stream.

Chlorination is carried out in the same way as in the foregoing examples. n-pentane is isomerized under the following test conditions :

| | |
|---|---|
| Isomerization temperature | : 110°C |
| Reactor pressure | : 20 Kg/cm2 |
| Molar ratio $H_2$/hydrocarbons | : 4 |
| Space velocity | : 1.5 v.v.h. |

The products have been analysed by vapor phase chromatography and found to have the composition given in Table IV.

TABLE IV

| Product | Time in hours | Charge | 10 | 20 | 30 | 50 |
|---|---|---|---|---|---|---|
| | % weight | | | | | |
| Hydrocarbons < $C_5$ | | <0.05 | 0.20 | 0.20 | 0.15 | 0.1 |
| Isopentane | | 0.4 | 30.0 | 35.5 | 40.0 | 45.5 |
| n-pentane | | 99.1 | 69.5 | 63.97 | 59.55 | 54.1 |
| Cyclopentane | | 0.5 | 0.3 | 0.33 | 0.3 | 0.3 |

EXAMPLES 5 to 16

100 g of a catalyst consisting of alumina having an η-alumina content of about 80 percent by weight, a surface of 400 m²/g and a platinum content of 0.3 percent (0 percent in example 16) are impregnated with a solution of a polyhydroxy, polyoxo-or polyalkoxyaromatic compound in chloroform at room temperature, so as to supply said alumina with an amount of aromatic compound which, after solvent evaporation, is the same as the percentage by weight with respect to the catalyst which is given in table V. The catalyst is then charged into the isomerization reactor which is brought to 200°C under nitrogen stream. Carbon tetrachloride, carried along with nitrogen whose feed rate is 600 liters per liter of catalyst per hour, is introduced therein. 18 cc of $CCl_4$ are thus introduced in 1 hour. The reactor temperature is then raised to 280°C with the same nitrogen feed rate and 18 cc of $CCl_4$ are introduced again in 1 hour. A light gasoline of the following composition by weight :

| | | |
|---|---|---|
| Isopentane | 17.6 | % |
| n-pentane | 28.0 | % |
| Isohexanes | 24.7 | % |
| n-hexane | 24.6 | % |
| Naphthenes | 4.1 | % |
| Heptane | 1 | % | is isomerized on the so-treated catalyst.
The test conditions are as follows:

| | |
|---|---|
| Temperature of the isomerization reactor | 130°C |
| Pressure within the reactor | 20 Kg/cm2 |
| Molar ratio of $H_2$ to the hydrocarbons | 4 |
| Feed rate of the light gasoline | 1 v.v.h. |
| Water content of the feed charge | < 10 ppm. |

The results are summarized in Table V which gives the percent of the selected aromatic compound with respect to the catalyst and the analysis of the effluent after 50 and 100 hours of run. (Table V).

EXAMPLE 17

100 g of a catalyst consisting of alumina having a content of η-alumina higher than 60 percent and a surface of 300 m²/g, and containing 0.35 percent by weight of platinum are introduced into the isomerization reactor and heated up to 280°C under a nitrogen stream whose feed rate is 600 liters per liter of catalyst per hour.

After 1 hour of stripping with nitrogen, carbon tetrachloride is admitted. 30 cc of $CCl_4$ are thus introduced in 1 hour. The resulting catalyst contains 0.33 percent of platinum and 6.7 percent b.w. of chlorine. After stripping with nitrogen at 280°C, the temperature is lowered to 150°C and nitrogen is replaced with hydrogen. A solution of benzoquinone in pentane (2g per liter) is also introduced at a rate of 100 cc per hour. 200 cc of this solution are thus passed therethrough. The isomerization of n-pentane is carried out according to the following test conditions :

| | |
|---|---|
| Temperature within the isomerization reactor | : 120°C |
| Pressure within the reactor | : 20 KG/cm2 |
| Molar ratio $H_2$/hydrocarbon | : 3 |
| $C_5$ feed rate (v.v.h.) per volume of catalyst and per hour. | : 1 liquid volume |
| Water content of the n-$C_5$ | < 10 ppm. |

The products have been analysed by vapor phase chromatography and found to have the composition summarized in Table VI.

TABLE VI

| Product % b.w. | Time in hours | Charge | 10 | 20 | 40 | 80 | 120 |
|---|---|---|---|---|---|---|---|
| Hydrocarbons < $C_5$ | | <0.05 | 0.15 | 0.25 | 0.27 | 0.30 | 0.29 |
| Isopentane | | 0.4 | 36.0 | 46.0 | 55.2 | 60.3 | 60.0 |
| N-Pentane | | 89.1 | 63.53 | 53.4 | 44.2 | 39.2 | 39.5 |
| Cyclopentane | | 0.5 | 0.32 | 0.35 | 0.33 | 0.20 | 0.21 |

TABLE V

| N° Example | Nature of the compound | Amoung o/o b.w. | Analysis of the effluent after 50 h | | | Analysis of the effluent after 100 h | | |
|---|---|---|---|---|---|---|---|---|
| | | | $< C_5$ % | %iso $C_5 \over C_5$ | %iso $C_6 \over C_6$ | $< C_5$ % | %iso $C_5 \over C_5$ | %iso $C_6 \over C_6$ |
| 5 | Resorcinol | 1.1 | 0.25 | 75.5 | 87.3 | 0.20 | 75.6 | 87.2 |
| 6 | Chlorohydroquinone | 1.6 | 0.35 | 72.5 | 82.5 | 0.25 | 73.0 | 83.0 |
| 7 | Fluoranil | 3.0 | 0.20 | 70.5 | 78.0 | 0.15 | 69.0 | 77.0 |
| 8 | Chloranilic acid | 4.0 | 0.15 | 71.0 | 81.5 | 0.15 | 72.0 | 82.0 |
| 9 | Pyrogallol | 2.5 | 0.10 | 70.5 | 79.5 | 0.10 | 71.5 | 80.0 |
| 10 | 2,3 Dihydroxy naphthalene | 0.5 | 0.15 | 58.5 | 67.5 | 0.10 | 57.5 | 67.0 |
| 11 | Antranquinone | 5.0 | 0.10 | 57.0 | 68.0 | 0.10 | 58.5 | 69.5 |
| 12 | Alizarine | 3.5 | 0.35 | 72.5 | 86.0 | 0.25 | 74.0 | 86.5 |
| 13 | 1,2,7 trihydroxy 9,10 antranquinone | 6.0 | 0.15 | 58.5 | 68.5 | 0.10 | 58.0 | 68.6 |
| 14 | 1,2,3 trimethoxy benzene | 3.0 | 0.25 | 68.5 | 78.0 | 0.15 | 71.0 | 81.0 |
| 15 | 4 Methoxy phenol | 2.0 | 0.20 | 65.0 | 72.5 | 0.15 | 70.5 | 80.0 |
| 15* | 4 Methoxy phenol | 2.0 | 0.80 | 62.0 | 71.0 | 0.85 | 60.5 | 70.0 |

\* Catalyst without platinum

EXAMPLE 18

50 g of a conventional reforming catalyst consisting of $\gamma$ — alumina whose specific surface is 250 m²/g and containing 0.34 percent b.w. of platinum are introduced into an isomerization reactor and heated up to 280°C in a nitrogen stream whose feed rate is 600 liters per liter of catalyst and per hour. After 1 hour of nitrogen stripping, there is introduced a 5 percent b.w. solution of 1,2 — dimethoxy benzene in carbon tetrachloride at a feed rate of 12 cc per hour. After nitrogen stripping at 290°C, the temperature is lowered to 150°C and nitrogen is substituted whith hydrogen. The isomerization of n-pentane is carried out under the following conditions:

| | |
|---|---|
| Temperature of the isomerization reactor | : 150°C |
| Pressure within the reactor | : 20 Kg/cm² |
| Molar ratio H²/hydrocarbons | : 2.5 |
| n-$C_5$ feed rate | : 1 v.v.h. |
| Water content of the n - $C_5$ | : < 10 p.p.m. |

The products have been analysed by vapor phase chromatography and found to have the composition stated in Table VII

TABLE VII

| Products % b.w. | Charge | Time in hours | | | | |
|---|---|---|---|---|---|---|
| | | 10 | 20 | 50 | 80 | 120 |
| Hydrocarbons $< C_5$ | <0.05 | 0.12 | 0.15 | 0.17 | 0.20 | 0.22 |
| Isopentane | 0.4 | 30.0 | 42.3 | 50.8 | 55.1 | 55.3 |
| n-pentane | 99.1 | 69.4 | 57.2 | 48.7 | 44.4 | 44.08 |
| Cyclopentane | 0.5 | 0.48 | 0.35 | 0.33 | 0.30 | 0.30 |

Other aromatic compounds which may be successfully used for manufacturing isomerization catalysts according to the invention are hereinafter indicated : 4chloro-1,2-benzoquinone ; 2,5-dimethyl-1,4-benzoquinone ; pyrogallol ; hydroxyquinol ; phloroglucinol; 9,10-dihydroxy anthracene ; 1, 2, 10-trihydroxy anthracene ; 9,10-phenanthraquinone; 9,10-anthraquinone ; 2-methoxy phenol ; 3-methoxy phenol ; pyrocatechol dimethylether ; hydroquinone dimethylether ; 3-methoxy-4-hydroxy toluene ; 2-isopropyl hydroquinone diethylether ; chloro-pyrocatechol dimethyl ether ; fluoro resorcinol dimethyl ether ; bromo hydroquinone dimethyl ether ; phloroglucinol trimethyl ether ; pyrogallol trimethyl ether ; 2,3-dimethoxy phenol ; 2,3,4-trimethoxy phenol ; 2,3-dimethoxy naphthalene ; 1-hydroxy -3-methoxy naphthalene and 4,5-dihydroxy-7-methoxy anthraquinone.

What we claim as our invention:

1. In a process for manufacturing a catalyst, wherein alumina composited with a platinum group metal is halogenated with a halogen compound selected from the group consisting of chlorinated hydrocarbon, chlorine, $SOCl_2$, $SO_2Cl_2$ and $S_2Cl_2$, to form a composite consisting essentially of alumina, about 1–20 percent by weight of halogen, and about 0.01–5 percent by weight of said platinum group metal, the improvement of also compositing with said alumina an aromatic compound of the formula $(R)_m$ Ar $(Z)_x$ where x is an integer of at least 2, m is zero or an integer, (x + m) being at most the maximum valence of Ar, Ar is an aromatic hydrocarbon radical containing at least one carbocyclic ring, the m groups R are independently halogen atoms or monovalent hydrocarbon radicals and the x groups Z are independently hydroxy, oxo or hydrocarbyloxy, the aromatic compound content of said composite being about 0.001–20 percent by weight.

2. The process of claim 1, wherein alumina is composited first with the platinum group metal and then with the aromatic compound.

3. The process of claim 1, wherein alumina is composited first with the platinum group metal, then with the aromatic compound and finally with the halogen compound.

4. The process of claim 1, wherein the carbocyclic ring of said aromatic compound is the carbocyclic ring of benzene, naphthalene, anthracene, phenanthrene or acenaphthene.

5. The process of claim 1, wherein x is 2 to 4.

6. The process of claim 1, wherein the halogen compound is a chlorinated hydrocarbon.

7. The process of claim 1, wherein the halogen compound is selected from the group consisting of methylene chloride, chloroform and carbon tetrachloride.

8. A process as defined by claim 1 wherein said aromatic compound is of the formula:

$Y_n C_6 H_{4-n}(Z)_2$ wherein Y is alkyl, cycloalkyl aryl, or halogen n is 0,1,2,3, or 4.

9. A process as defined by claim 1 wherein the aromatic compound is selected from the group consisting of pyrocatechol, tetrachlorohydro-hydroquinone, benzoquinone, resorcinol, chlorohydroquinone, fluoranil, chloranilic acid, pyrogallol, 2,3 dihydroxy naphthalene, anthraquinone, alizarine, 1,2,7 trihydroxy 9,10 anthraquinone, 1,2,3 trimethoxy benzene, 4 methoxy phenol, 1,2-demethoxy benzene, 4-chloro-1,2-benzoquinone, 2,5-dimethyl-1,4-benzoquinone, pyrogallol, hydroxyquinol, phloroglucinol, 9,10-dihydroxy anthracene, 1,2, 10trihydroxy anthracene, 9,10-phenanthraquinone, 9,10-anthraquinone, 2-methoxy phenol, 3-methoxy phenol, pyrocatechol dimethylether, hydroquinone dimethylether, 3-methoxy-4-hydroxy toluene, 2-isopropyl hydroquinone diethylether, chloropyrocatechol dimethyl ether, fluoro resorcinol dimethyl ether, bromo hydroquinone dimethyl ether, phloroglucinol trimethyl ether, pyrogallol trimethyl ether, 2,3-dimethoxy phenol, 2,3,4-trimethoxy phenol, 2,3-dimethoxy naphthalene, 1-hydroxy-3-methoxy naphthalene and 4,5-dihydroxy-7-methoxy anthraquinone.

10. A process as defined by claim 9 wherein the amount of aromatic compound is by weight 0.01 to 10 percent and the halogen is 4 to 12 percent.

11. A catalyst as produced by the process of claim 1.
12. A catalyst as produced by the process of claim 3.
13. A catalyst as produced by the process of claim 7.
14. A catalyst as produced by the process of claim 9.
15. A catalyst as produced by the process of claim 10.

* * * * *

UNITED STATES PATENT OFFICE
CERTIFICATE OF CORRECTION

PATENT NO. : 3,870,653
DATED : March 11, 1975
INVENTOR(S) : Torck, Bernard; Derrien, Michel; et al It is certified that error appears in the above-identified patent and that said Letters Patent are hereby corrected as shown below:

Table II; number down from "100" and across from "cyclopentane" should be changed from ".020" to --0.29--.

Column 7, line 1, after the word "consisting" insert --of--.

Table V "11 Antranquinone" should be changed to --11 Anthranquinone--. SAME CORRECTION FOR "13".
last line "15  4 Methoxy phenol" should be changed to --16  4 Methoxy phenol --.

In Tables I, III, IV under charge, across from "Hydrocarbons  C5" change "$\leq 0.05$" to -- $< 0.05$ --

Column 2, line 15, delete --s-- from the word "B-aluminas"
Column 2, line 32, the word "and should be changed to --to--
Column 2, line 53, the word "homogenous" should be changed to --homogeneous--.
Column 2, line 67 "(Z))X" should be changed to--(Z)X--.
Column 4, line 67 "mixtures" should follow "industrial", before "containing".
Column 5, line 7, --at-- should follow "out" before "a".
Column 6, line 30, "Water content of n-pentane $<$ 20 ppm" should be on separate line below "space velocity ----" note the sign $>$ should be $<$ as in original.

Signed and Sealed this second Day of December 1975

[SEAL]

Attest:

RUTH C. MASON
*Attesting Officer*

C. MARSHALL DANN
*Commissioner of Patents and Trademarks*